United States Patent [19]
Mohme et al.

[11] Patent Number: 5,237,674
[45] Date of Patent: Aug. 17, 1993

[54] SELF IDENTIFYING SCHEME FOR MEMORY MODULE INCLUDING CIRCUITRY FOR IDENTFYING ACCESSING SPEED

[75] Inventors: Rodger Mohme; Jerome Okun, both of Campbell; R. Steven Smith, Cupertino; Michael De La Cruz, Saratoga, all of Calif.

[73] Assignee: Apple Computer, Inc., Cupertino, Calif.

[21] Appl. No.: 713,639

[22] Filed: Jun. 10, 1991

Related U.S. Application Data

[63] Continuation of Ser. No. 336,522, Apr. 10, 1989, abandoned, which is a continuation of Ser. No. 48,074, Apr. 11, 1987, abandoned.

[51] Int. Cl.⁵ ............ G06F 12/00; G06F 13/00; G11C 7/00
[52] U.S. Cl. ................... 395/425; 365/52; 365/230.03; 365/175; 365/243
[58] Field of Search ............ 365/200, 900, 52, 230.03, 365/230.06, 174, 175, 189.03, 233, 242, 243; 235/492; 395/425

[56] References Cited

U.S. PATENT DOCUMENTS

| | | | |
|---|---|---|---|
| 4,366,540 | 12/1982 | Berglund et al. | 364/200 |
| 4,458,357 | 7/1984 | Weymouth et al. | 364/200 |
| 4,468,731 | 8/1984 | Johnson et al. | 364/200 |
| 4,499,536 | 2/1985 | Gemma et al. | 364/200 |
| 4,545,010 | 10/1985 | Salas et al. | 364/200 |
| 4,558,436 | 12/1985 | Wagensonnar et al. | 365/230 |
| 4,566,082 | 1/1986 | Anderson | 365/230 |
| 4,594,690 | 6/1986 | Meyers et al. | 365/230 |
| 4,608,689 | 2/1986 | Sato | 364/200 |
| 4,807,161 | 2/1989 | Comfort et al. | 364/550 |
| 4,821,229 | 4/1989 | Jauregui | 364/900 |

FOREIGN PATENT DOCUMENTS

| | | |
|---|---|---|
| 0057645 | 8/1982 | European Pat. Off. ............ 365/175 |
| 0127002 | 5/1984 | European Pat. Off. . |
| 0136178 | 9/1984 | European Pat. Off. . |
| 0179981 | 6/1985 | European Pat. Off. . |
| 0200198 | 4/1986 | European Pat. Off. . |

Primary Examiner—Glenn Gossage
Attorney, Agent, or Firm—Blakely, Sokoloff, Taylor & Zafman

[57] ABSTRACT

A self-identifying scheme which permits a variety of integrated circuit semiconductor memory modules to inform a host processor as to each individual memory accessing speed or accessing time. Pre-encoded circuits within each memory module generate a coded signal when that module is selected by the host processor. The coded signal identifies the type of memory accessed, permitting the host processor to transfer information at a rate determined by the memory accessed.

9 Claims, 3 Drawing Sheets

SELF IDENTIFYING SCHEME FOR MEMORY MODULE INCLUDING CIRCUITRY FOR IDENTFYING ACCESSING SPEED

This is a continuation of application Ser. No. 336,522 filed Apr. 10, 1989, now abandoned, which is a continuation of application Ser. No. 07/048,074, filed Apr. 11, 1987, also now abandoned.

BACKGROUND OF THE INVENTION

1. Field of the Invention

This invention relates to computer memories, and more specifically for a memory to self-identify its access time.

2. Prior Art

The use of various memory devices for storing information is well-known in the prior art. These memory devices can be internal or external devices and are coupled to a host unit, such as a central processing unit (CPU). The host unit provides the addressing, as well as other control signals, to access a location in memory for reading or writing information to and from such a location.

Although various memory units can be configured with a given host hardware, the memory unit must be configured to function with a particular host unit. At the time a particular memory unit is configured within the system, the host unit must be capable of operating with the memory unit. Proper hand shaking and synchronization are essential elements for information transfer to be established between the two units. In a typical situation, the memory unit is configured to a previously determined host unit, such as a CPU, so that the memory unit must be specially designed to operate within certain limited constraints imposed by the host unit.

Because different memory units operate at different speeds, each memory unit must be specially configured and interfaced to operate with a given CPU. Such interfacing must be accomplished at the time the memory unit is coupled to the CPU, or typically, the memory unit is predesigned to operate at a given speed determined by the CPU.

Where a number of memory units are coupled to the same CPU, a further problem is encountered in that some of the memory units may operate at different speeds. Because random-access memories (RAM) are capable of running at a faster speed than read-only memories (ROM), the CPU must know the location or address of these various memory units so that the host unit can change its accessing speed if efficient use of these memories is desired. If the CPU cannot differentiate among the different memories, then it must operate at the accessing speed of the slowest memory unit.

In another related technology, modularized memory units are being designed for various uses. In one area, memory modules are designed to be plugged into various interfacing connectors, such that various modules representing different memory types are interfaced with the same host unit. In the prior art a given memory type must be plugged into a predesigned location, so that the CPU knows the characteristics of the memory unit by its location. However, such, a preordained system limits the flexibility of modularized design. What is desired in this instance is to have a memory unit having a capability of being plugged into any given module location and permitting the CPU to identify that memory unit by its type and not by the location that it is plugged into.

In another application, a memory connection is coupled to a host unit. However, the memory connection is capable of interfacing with various types of memory units. For example, in an automatic bank teller machine, or a security/identification machine, a memory unit, such as a bankcard having a magnetic strip, is inserted into the connection for accessing the host unit. Although the bank teller machines of today read magnetic strips on cards, a more sophisticated unit can access memory devices which contain substantial memory mass storage. Compact and portable mass storage units are achieved by utilizing integrated circuit semiconductor memories. In the above example, the host unit must be capable of identifying the different types of memory units which plug into the machine and for efficient operation the machine must be capable of accessing these various memory units at accessing speeds which correspond to the different memory units.

Therefore, in implementing modularized memory designs, it is appreciated that what is needed is a self-identifying memory, wherein a particular memory unit provides certain identifying information for its access by the host unit. One such information being its memory accessing speed.

SUMMARY OF THE INVENTION

The present invention provides for an apparatus and a method for self-identifying an accessing time of a given memory device. Modularized integrated circuit semiconductor memories are coupled to a host hardware for providing data transfer. Each memory module contains a pre-encoded circuit which generates a coded signal when that particular memory module is selected by the host unit. The coded signal is then sent to the host unit to inform it as to the memory accessing time of the selected module. By encoding each memory module, the modules can be made homogeneous to provide interchangeability and the host unit need not know the identity of the memory module until it is accessed by the host unit.

The self-identifying scheme is implemented by coupling bit lines through pull-up resistors to a voltage potential. Predetermined bit lines are each coupled through a diode to the memory select line. When the select line is not active, the bit lines remain in a high state due to the voltage coupled to the pull-up resistors. However, when the select line is active, the diodes conduct and pull those predetermined bit lines to a low state, thereby placing a coded signal on the bit lines. By this scheme a plurality of memory modules can be coupled to a common bus.

DETAILED DESCRIPTION OF THE PRESENT INVENTION

The present invention provides for an apparatus and a method for self-identifying an accessing time of a given memory. In the following description, numerous specific details are set forth, such as specific number of bits, memory configuration, etc., in order to provide a thorough understanding of the present invention. It will be obvious, however, to one skilled in the art that the present invention may be practiced without these specific details. In other instances, well-known structures, such as control lines, have not been set forth in order not to unnecessarily obscure the present invention.

Figure 1:
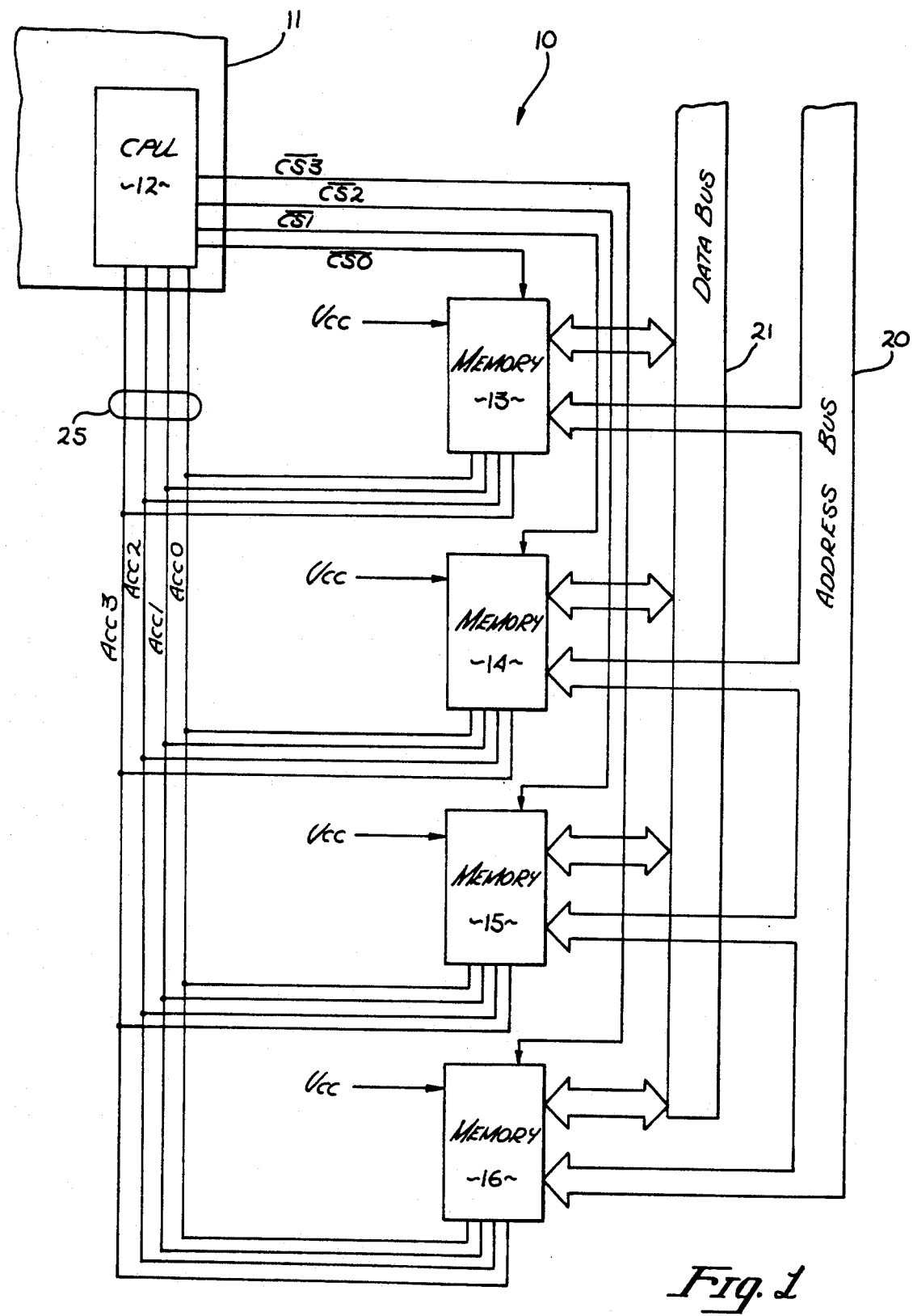
FIG. 1 is a block diagram showing the interfacing of various memory modules to a host unit.

Referring to FIG. 1, a circuit block diagram 10 of the present invention is shown. Circuit 10 is comprised of a host hardware 11, interconnections and various memory units 13-16 of the present invention. The host hardware of the present invention includes a CPU 12; however, a variety of other hardware controllers can provide equivalent functions in communicating and controlling memories 13-16. Each of the memories 13-16 are coupled to an address bus 20 and data bus 21. Address bus 20 and data bus 21 may be of a variety of prior art buses for accessing memories by providing an address on address bus 20 and reading or writing data from and to memories 13-16 on data bus 21. Address bus 20 and data bus 21 are coupled to the CPU 12, but can readily be coupled to other data exchanging units, such as decoders, as well. Although four memories are shown in FIG. 1, any number can be utilized without departing from the spirit and scope of the invention.

Each of the memories 13-16 are coupled to a memory identification bus 25 which is then coupled to the host unit 11. Bus 25 can be coupled directly to the CPU 12 or to interfacing means within host 11, such as the earlier stated decoder, wherein the interfacing means can further decode signals on bus 25. Bus 25 of the preferred embodiment is comprised of four lines labeled ACC0, ACC2 and ACC3, which designate bits 0-3 for identifying the various accessing times of memories 13-16. In the preferred embodiment, bus 25 is comprised of four lines for carrying four bits ACC0-ACC3 such that 16 possible encoding combinations are available to select 16 possible memory accessing speeds. It is readily possible to have less or more lines to bus 25 to provide other than 4-bit encoding combinations for identifying the various memories 13-16. Each of the memory units 13-16 are coupled to the CPU 12 by an individual chip select line, wherein $\overline{CS0}$ is coupled to memory 13, $\overline{CS1}$ to memory 14, $\overline{CS2}$ memory 15 and $\overline{CS3}$ to memory 16. It is appreciated that other memory select schemes, well-known in the art, can be used for activating each of the memories 13-16.

In operation, CPU 12 will select one of the memory units 13-16 to be activated, at which time one of the $\overline{CSn}$ lines corresponding to the memory unit which is to be activated is pulled low. Only one memory is selected at any given period of time. The selected memory will access bus 25 for providing coded signals onto bus 25 for coupling to CPU 12. The unselected memories will not access bus 25 in order not to interfere with the properly encoded signal.

Functionally, memory units 13-16 may be comprised of a variety of memory units and devices; however, as used in the preferred embodiment, each of the memory units 13-16 are integrated circuit modules and more specifically, integrated-circuit semiconductor memory modules. Memories 13-16 are integrated circuit devices which are formed from a semiconductor device and may include main memory for computers, read/write mass storage units, or read-only mass storage units. Memories 13-16 may be comprised of any or all of these various integrated circuit modules.

To optimize the accessing speed of the CPU 12 to each of the memories 13-16, each memory 13-16 must self-identify its accessing speed by the CPU 12. For example, RAMs typically operate much faster than ROMs and therefore, RAM accessing speed by the CPU 12 should be at a faster rate than that of a ROM to take advantage of the faster data transfer rate of RAMs. That is, if memories 13-16 contain both ROMs and RAMs, it is an advantage to access ROMs at a first speed and RAMs at a second speed which is faster than the first. For each memory 13-16 to inform the CPU 12 as to its accessing time whenever its appropriate chip select signal is activated, the corresponding memory unit will provide a coded signal to bus 25 to inform the CPU 12 as to the type and accessing speed of its memory. Further, because the memory units 13-16 are self-identifying, if they are constructed homogeneously, then they are capable of being inserted in any of the four locations shown in FIG. 1.

Figure 2:
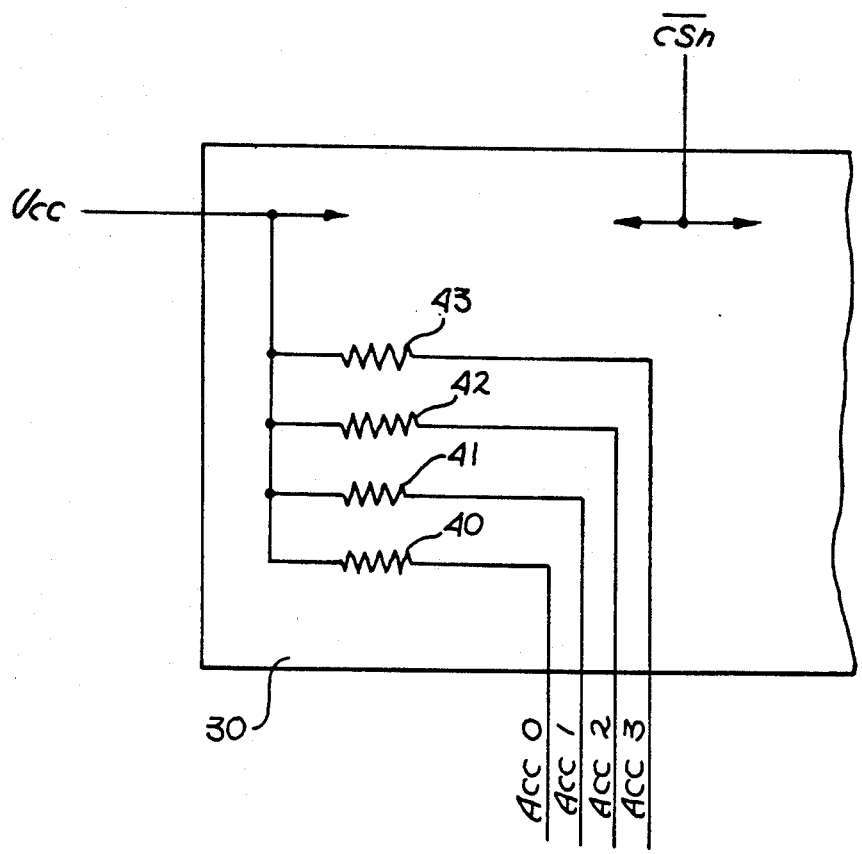
FIG. 2 is a schematic diagram showing a self-identifying encoding feature of a memory module shown in FIG. 1.

Referring to FIG. 2, a portion of a memory unit 30 is shown. Memory unit 30 is a detailed description of any of the memory units 13-16 of FIG. 1. A chip select signal $\overline{CSn}$ is coupled to the memory unit 30 and a supply voltage Vcc, which can be generated internally or externally to memory 30, is coupled to memory 30 also. ACC0-ACC3 outputs from memory unit 30 are coupled to bus 25 of FIG. 1. In this particular embodiment, pull-up resistors 40-43 are utilized to couple ACC0-ACC3 lines to Vcc, respectively. Alternatively, any, all or none of the resistors 40-43 can be coupled to other state levels, such as ground. It is to be appreciated that although only one voltage source is shown, any number may be utilized with the configuration of the present invention. Further, other components besides pull-up resistors can be utilized to provide coded signals onto lines ACC0-ACC3.

Figure 3:
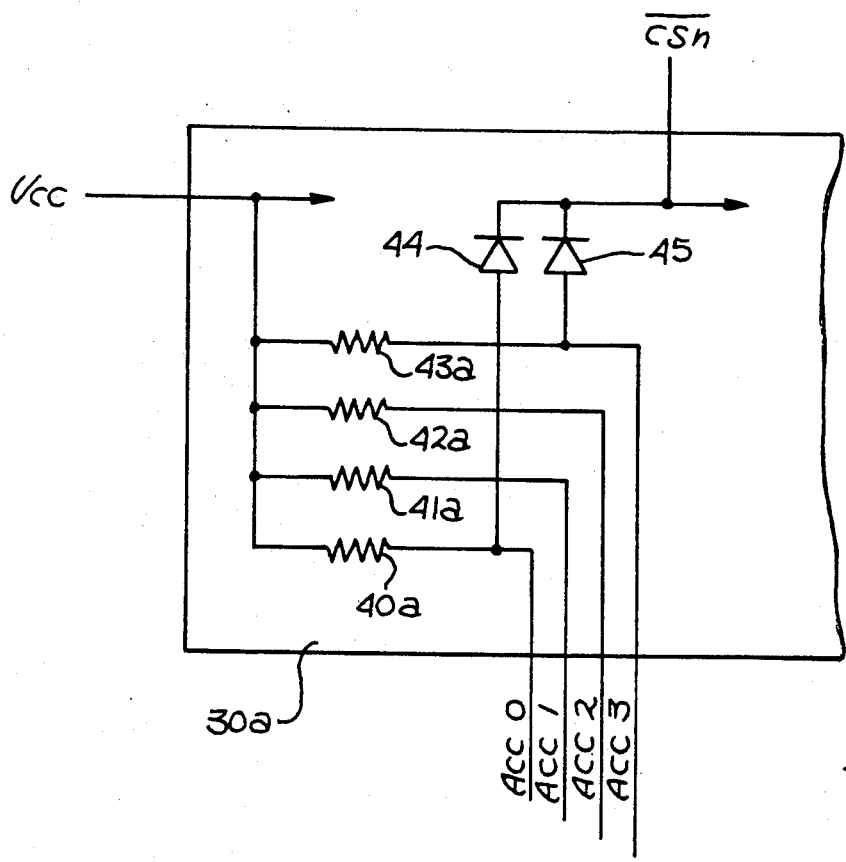
FIG. 3 is a schematic diagram showing one example of using diodes to encode the self-identifying feature.

Referring to FIG. 3, one example is shown wherein memory 30a, which is equivalent to memory 30 of FIG. 2, is pre-encoded to provide a four-bit coded signal onto lines ACC0-ACC3. In this particular example, diodes 44 and 45 are coupled to ACC0 and ACC3. Diode 44 is coupled having its anode coupled to ACC0 and diode 45 having its anode coupled to ACC3. The cathodes of diodes 44 and 45 are coupled to the chip select line $\overline{CSn}$.

In operation, when memory 30a is not selected, line $\overline{CSn}$ is in a high state wherein all lines ACC0-ACC3 are pulled up to the higher voltage level of Vcc through pull-up resistors 40a-43a. When memory 30a is selected, chip select signal $\overline{CSn}$ goes to a low state, causing diodes 44 and 45 to conduct. Conduction of diodes 44 and 45 pull lines ACC0 and ACC3 low causing those lines to generate coded signal of 0110 onto bus 25 which is then coupled to CPU 12 of FIG. 1. Thus, the host unit 11 need only know the coded interpretation of the coded signal generated from memory unit 30a. The hardware providing the predetermined encoding within memory unit 30a provides the self-identifying feature for each of the memory units which are coupled to CPU 12 of FIG. 1. In this preferred embodiment, the encoding is utilized to inform the host unit 11 the desired memory accessing speed for accessing each of the memory units for data transfer. Further, because the chip select signal selects this particular memory and not others, the ACC0-ACC3 output from the unselected memories are in a high state, thereby not interfereing with the coded signal of the selected memory.

Figure 4:
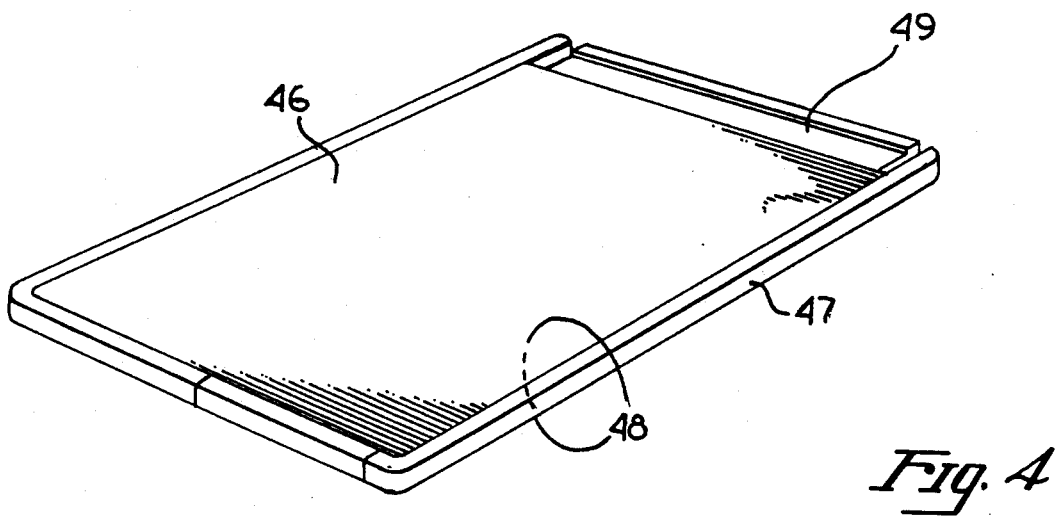
FIG. 4 is a pictorial representation of an integrated circuit memory module which is used in the preferred embodiment.

Referring to FIG. 4, a pictorial representation of an integrated circuit semiconductor memory module 46 of the present invention is shown. These homogeneously constructed modularized memory units can be made portable and pluggable such that these memory units can be readily interchanged with various interconnecting means. The preferred module 46 has a frame 47, top and bottom coverings 48 and connection 49.

Figure 5:
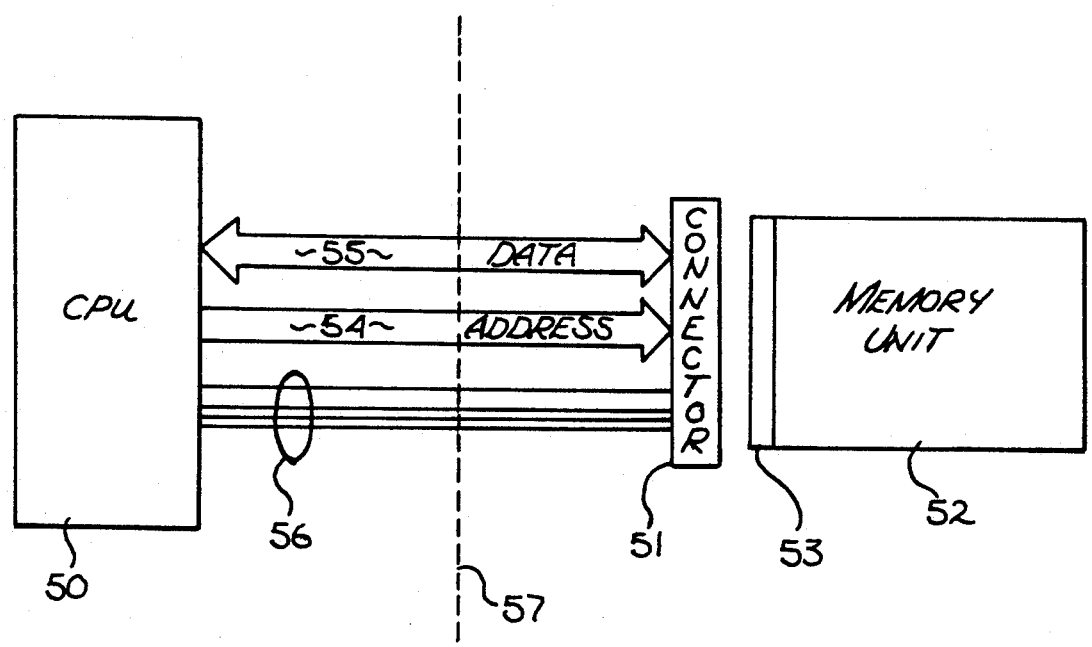
FIG. 5 is a block diagram showing the interface of a host CPU to a modularized memory interface connector which permits various homogeneous memory units to be plugged into it.

Referring to FIG. 5, an alternative embodiment of the present invention is shown. In this embodiment, CPU 50 is coupled to a connector 51, which operates as an interfacing means to a memory unit 52. Memory unit 52 has a mating contact 53 for plugging into connector 51. Address bus 54 and data bus 55 couple CPU 50 to connector 51. Bus 56, which is equivalent to bus 25 of FIG. 1, also couples CPU 50 to connector 51. A dotted line 57 separates CPU 50 from connector 51 to show that connector 51 can be located a significant distance from CPU 50. To connector 51, various memory units 52 can be coupled, wherein these various memory units can be of different types of memory having different accessing speeds. By utilizing the self-identifying encoding scheme of the present invention, the CPU 50 can identify the type of memory being coupled to connector 51. By knowing the type of memory unit 52, CPU 50 can change its accessing speed to a particular interchangeable memory unit being inserted into connector 51, so that a much more efficient transfer of information can be achieved.

It is also appreciated that although the present invention is utilized to provide coded signals to determine the accessing speed of memories, other information, such as memory size, can be encoded as well. Further, the identifying scheme can be used with peripheral units as well and is not limited for use with memory units only.

We claim:

1. A plug compatible and self-identifying memory device in a data processing system including a host processor, wherein said memory device is accessed by said host processor, said memory device comprising:

storage means coupled to said host processor for storing information, wherein said host processor accesses said storage means for transfer of said information, wherein said storage means has an accessing speed for said host processor, wherein said host processor includes a memory select line coupled to said storage means for selecting said storage means for transfer of said information, wherein said memory select line is in a first state when said host processor selects said storage means for transferring said information, wherein said memory select line is in a second state when said host processor does not select said storage means for transferring said information; and encoding means having a plurality of bit lines with each of said plurality bit lines being coupled to a supply voltage through a resistive means and a predetermined number of said plurality of bit lines being also coupled to said memory select line, for providing an encoded signal identifying the accessing speed of said storage means, wherein said plurality of bit lines are coupled to said host processor for transferring said encoded signal to said host processor, wherein when said host processor is not selecting said storage means for transferring said information, all of said plurality of bit lines are in a third state and said encoding means does not generate the encoded signal to said host processor, wherein when said host processor is selecting said storage means for transferring said information, said memory select line causes said predetermined number of said plurality of bit lines to change to said first state while the remaining of said plurality of bit lines are still in said third state in order to generate said encoded signal, and wherein said memory device can be identified as to said accessing speed independently from address location and only when said memory device is accessed.

2. The memory device defined in claim 1, wherein said memory device is modularized and is coupled to said host processor through a connector such that it can be readily removed for portability.

3. The memory device defined in claim 1, wherein said first state is a low voltage state, said second state is a high voltage state, and said third state is the high voltage state.

4. The memory device defined in claim 1, wherein said encoded signal can be changed by changing the number of said predetermined number of said plurality of bit lines coupled to said memory select line.

5. The memory device defined in claim 1, wherein said storage means is an integrated circuit memory.

6. The memory device defined in claim 1, wherein said memory device is a portable and insertable integrated circuit memory card coupled to said host processor through an interface connector.

7. A method of self-identifying the accessing speed of a portable and plug compatible integrated circuit memory module in a data processing system having a host device and a plurality of memory modules, wherein said host device accesses said memory module for transfer of data, wherein the method comprising the steps of:

pre-encoding the accessing speed of said memory module by providing a plurality of bit lines in said memory module, wherein each of said plurality bit lines is coupled to a supply voltage through a resistive means, wherein said host device includes a memory select line coupled to said memory module for selecting said memory module for transferring said data, wherein a predetermined number of said plurality of bit lines are also coupled to said memory select line to generate a coded and self-identifying signal representing the accessing speed of said memory module when said memory module is selected, wherein said plurality of bit lines are all in a first state when said host device is not selecting said memory module for transferring said data and said coded and self-identifying signal is not generated to said host device;

selecting said memory module for transferring said data with said host device by causing the memory select line to be in a second state, wherein said memory select line is in the second state when said host device selects said memory module for transferring said data, wherein said memory select line is in a third state when said host device does not select said memory module for transferring said data; and generating said coded and self-identifying signal from said memory module by causing said predetermined number of said plurality of bit lines to change to said second state while the remaining of said plurality of bit lines are still in said first state, and wherein said memory module is therefore identified as to said accessing speed independently from address location and only when said memory module is accessed.

8. The method of claim 7, wherein said first state is a high voltage state, said second state is a low voltage state, and said third state is the high voltage state.

9. The method of claim 7, wherein said coded and self-identifying signal can be changed by changing the number of said predetermined number of said plurality of bit lines coupled to said memory select line.

* * * * *